United States Patent [19]

Dyer

[11] 3,924,224

[45] Dec. 2, 1975

[54] METER READING SYSTEM

[75] Inventor: Robert E. Dyer, Springfield, Ill.

[73] Assignee: Sangamo Electric Company, Springfield, Ill.

[22] Filed: May 15, 1974

[21] Appl. No.: 470,267

[52] U.S. Cl. .......................... 340/310 A; 340/168 B

[51] Int. Cl.² .......................... H04M 11/04

[58] Field of Search .......................... 340/310 R, 310 A

[56] References Cited

UNITED STATES PATENTS

| | | | |
|---|---|---|---|
| 3,488,517 | 1/1970 | Cowan | 340/31 D R |
| 3,710,373 | 1/1973 | Watanabe | 340/310 R |
| 3,714,451 | 1/1973 | Whitney | 340/310 R |
| 3,810,096 | 5/1974 | Kabat | 340/310 R |

*Primary Examiner*—Thomas B. Habecker
*Attorney, Agent, or Firm*—Johnson, Dienner, Emrich & Wagner

[57] ABSTRACT

A system for remotely reading measurements made by a plurality of meters has a transmitter associated with each of the meters for generating signals representing data derived from the associated meter only during a time interval or channel discrete to the transmitter. A receiver coupled to the transmitters detects such signals and directs the signals detected during each channel to a memory device discrete to the channel, whereby the memory devices and meters are associated in one-to-one correspondence. In a preferred embodiment, a plurality of groups of transmitters are provided, each of which groups is tuned to generate signals of a different frequency. A discrete receiver for each group of transmitters is tuned to the signal frequency of its associated transmitter group. The transmitters and receivers are linked or connected over power line conductors and are synchronized to one another via said link. Means in both the transmitters and receivers also detect interruptions in the power, and automatically resynchronize the transmitters of a group and its associated receiver after each interruption.

22 Claims, 7 Drawing Figures

METER READING SYSTEM

BACKGROUND OF THE INVENTION

1. Field of the Invention

The present invention relates to remote meter reading systems, and more particularly to remote meter reading systems in which signals representing data derived from a plurality of meters are selectively transmitted from a group of transmitters associated with the different meters over power lines of an electric power distribution system to receiver means connected to the power lines.

2. Description of the Prior Art

In the utility industry, it is common practice to charge each consumer in accordance with the amount of utility service such as electric energy, gas, water or the like used over a period of time by the consumer. Highly reliable meters have been developed to measure the amount of the service used by a consumer. These meters are located at a point of supply to an individual consumer; for example, in an electric energy distribution system, the meters are located at a service main to each consumer.

The meters in each consumer's service main continually measure the amount of electric energy used by each consumer and provide a cumulative record of the measured energy use for readout at convenient time periods. It is a conventional practice for utility meter readers to manually read the information on the meters at monthly intervals. These readings are manually posted in a book or on a card which is carried by the meter reader to central utility offices for transcription, computation, and billing to the consumer.

The shortcomings of such data acquisition are well known in the utility industry. Inaccessible meters, as for example, when a consumer is not at home, result in meter reader callbacks or consumer meter misreadings, both of which are inconvenient to the consumer. Further, modern practice requires translation of the meter readings into computer compatible form, which introduces yet another source of potential error.

As a result the industry has sought to develop automated systems which automatically read the meter and provide the meter reading in a computer-compatible form for computer processing purposes. One such system is set forth in U.S. Pat. No. 3,754,250 issued Aug. 21, 1973 in the name of James N. Bruner. The meter reading system there described includes a mobile unit which travels a route laid out along the streets of a community, and, in its travel, transmits interrogating signals to transponder equipment connected to the meters passed along the route. The transponder equipment automatically generates and transmits signals to the mobile unit which represent the measurement on each meter and an identification number assigned to the meter.

In its most basic arrangement, the transponder equipment for a single meter may comprise an antenna having a transmit and receive section and a nonlinear impedance network, such as nonlinear diodes, connected therebetween. The interrogating signals transmitted by a directional antenna on the mobile unit are received by the receive section of the transponder antenna and impressed across the network. Distortion of the received signals by the nonlinear network generates a harmonic of the received interrogating signals. The transmit section of the transponder antenna is tuned to the frequency of the generated harmonic to radiate the harmonic signals back to the mobile unit. As the harmonic signals are generated, control circuitry in the transponder modulates the harmonic signals with data which indicates the measurement of the meter connected to the transponder and also an identification of the meter. The directional antenna picks up the modulated, harmonic signals and transmits the same to a receiver unit for detection. The detected signals are recorded for ultimate processing by a data processing unit.

Since a transponder for each meter in a system represents a significant cost, grouping several meters to common data accumulation and transponder equipment was developed at an early stage. In certain meter installations, for example meter installations in apartment houses and other multiple consumer structures, the meters and associated transponders may be so close together as to make difficult the selection of individual transponder antennas with the interrogating signals from the directional antenna on the mobile unit. For this reason, also, a more practical system has means which permit measurements made by a plurality of meters, each of which provide discrete meter data, to be transmitted from a common transponder to a mobile unit sending directional interrogating signals to the transponder.

However, in providing such a system, another problem arises. It is apparent, for instance, that in achieving said result it is necessary to provide a suitable communication path which connects the transponder of the different meters with the common transponder. The installation of a separate communication path often requires the use of local contractors which introduces added, undesirable costs. Moreover, some electric power lines and the like are buried beneath the ground for aesthetic reasons. Obviously, the stringing of new communication lines from meters on the lines to the transponder will not be acceptable in such areas and burying of further lines is costly and disturbing to the property owner.

One system for achieving interconnection of a plurality of meters with a common transponder is disclosed in co-pending U.S. Pat. application Ser. No. 230,873 filed Mar. 1, 1972 in the names of Finley, Jr., et al. In this system transmitter devices each associated with one meter continually transmit signals which cumulatively represent the reading on the associated meter over preexisting electric power line conductors to a receiver at a location remote from the meters. One transponder at the receiver may then forward a reading of each meter.

In one embodiment the transmitters are divided into groups, each group having an assigned, discrete band of operating frequencies. Each transmitter in a group generates signals at a different, assigned frequency within the frequency band assigned to the group of transmitters. The transmitters in each group are further divided into subgroups, the transmitters of each subgroup being connected to a predetermined, different pair of power line conductors. For example, three such conductors usually provide electrical service to each consumer thereby permitting three subgroups of transmitters in each group.

Each transmitter has an oscillator for continually generating signals at the frequency assigned to the transmitter. An encoder circuit including an encoder switch operated between a first and a second position by the meter associated with the transmitter enables the oscillator signals in one of two conditions corresponding to the switch positions for representing successive, predetermined measurement increments of the associated meter. In one embodiment, the encoder circuit enables the oscillator at different half cycle phases of the power on the conductor pair to which the transmitter is connected for representing the successive meter increments.

Groups of receivers are connected to the power line conductors, each group of receivers being tuned to receive signals of one group of transmitters. Receivers in each group are connected in subgroups to the different line conductor pairs of the subgroups of transmitters. In one embodiment each subgroup of receivers is one receiver which periodically receives the signals of each transmitter in one subgroup of transmitters. To do this, a tuner for the receiver periodically tunes the receiver to the signal frequency of each transmitter in a subgroup for sampling the signal of each transmitter in the subgroup, for example at one transmitter per second. A phase detector in the receiver detects the encoded phase of each transmitter signal received to provide a receiver output signal indicating the successive measurement increments of each meter. A multiplexer driven in synchronism with the tuner gates receiver output signals thus provided from each meter to discrete means for storing the signals then representing, in stored accumulation, the measurements of each meter.

Finally, a signal processor, for example one as set forth in the above identified patent to Bruner, generates words which include the identity and stored measurement of each meter. A transponder responds to interrogating signals from a mobile unit to effect readout of the words for storage in the mobile unit.

While the arrangement of the above identified application may be entirely satisfactory in certain installations, the use of such arrangement in systems having high transmitter-to-receiver signal attenuation may present difficulties in tuning the receivers to the frequency of just one transmitter. While a more selective receiver may be used to avoid this problem, the required cost may be difficult to justify. As yet another solution the transmitter frequencies may be expanded to permit greater frequency separation and easier receiver discrimination between transmitter signal frequencies. Such an arrangement, however, introduces harmonics of the various transmitter frequencies which tend to defeat the desired improvement in receiver discrimination. The harmonics problem may also be encountered as the number of transmitters in a subgroup is expanded beyond a practical limit of unique frequency signals per subgroup.

SUMMARY OF THE INVENTION

It is therefore an object of the invention to provide a remote meter reading system which operates suitably in high transmitter-to-receiver signal attenuation installations. Each meter of the system has a discrete transmitter associated therewith, each transmitter including means for generating signals which represent as data successive increments of measurement made by said meter, and means for providing the signal as an output from the transmitter only during a selected time interval or channel of a frame in periodic time frames. A receiver is coupled to a preassigned plurality of said transmitters to detect the transmitter output signals. Each transmitter coupled to the receiver is assigned a different one of the channels and is enabled to provide signals to the common receiver only during its discretely assigned channel time interval.

The receiver includes means synchronized to the transmitter channels for directing signals detected during each channel to one of a plurality of memory devices which is thus discretely assigned to said channel. Each memory device then stores the detected transmitter signals which represent, in accumulation, the measurements of a different one of the meters. Further means later process the stored, measurement representing signals for other uses, as for example, billing of a consumer.

A preferred embodiment of the system has transmitters coupled to receivers by electric power supply lines. Phases of the power on the supply lines are detected by means in both the transmitter and receiver for synchronizing the transmitter signal channels to the receiver signal directing means. Novel means in both the transmitter and receiver detect interruptions in the power supply for resynchronizing the transmitter channel and receiver signal directing means after the power interruption. Still further means in the receivers detect errors in receiving the transmitter signals.

It will be understood by those in the art that the teachings of this invention may be combined with those of the above identified application in alternative embodiments. One alternative embodiment has both selected transmitter signal frequencies and selected transmitter time interval channels. In this embodiment the discrete channels selected for the transmitter signals need be different only for transmitters of the same signal frequency, if the receiver has means for separating the signals by the selected transmitter frequencies. Another alternative embodiment combining the teachings of this invention with those of the identified application has subgroups of transmitters coupled to receivers over different pairs of power line conductors. In this embodiment the transmitter signal channels need be discrete only for transmitters coupled to the same receiver. Still another alternative embodiment combining the teachings of this invention with those of the identified application has both selected frequencies of transmitter signals and different pairs of conductors coupling sub-groups of transmitters to different receivers as well as different selected channel time intervals of enabled transmitter signals. In this embodiment the channels selected for enabling signals from each transmitter need be different only for transmitters of the same frequency coupled to a receiver over the same conductor pair. A specific embodiment of the first alternative embodiment has transmitters of 11 different signal frequencies and 16 selected channels during which signals from a selected one of 16 transmitters of the same frequency are enabled for a total of 176 distinct metermemory device associations.

DESCRIPTIONS OF THE DRAWINGS

A preferred embodiment which is intended to illustrate and not to limit the invention will now be described with reference to drawings in which.

Figure 2:
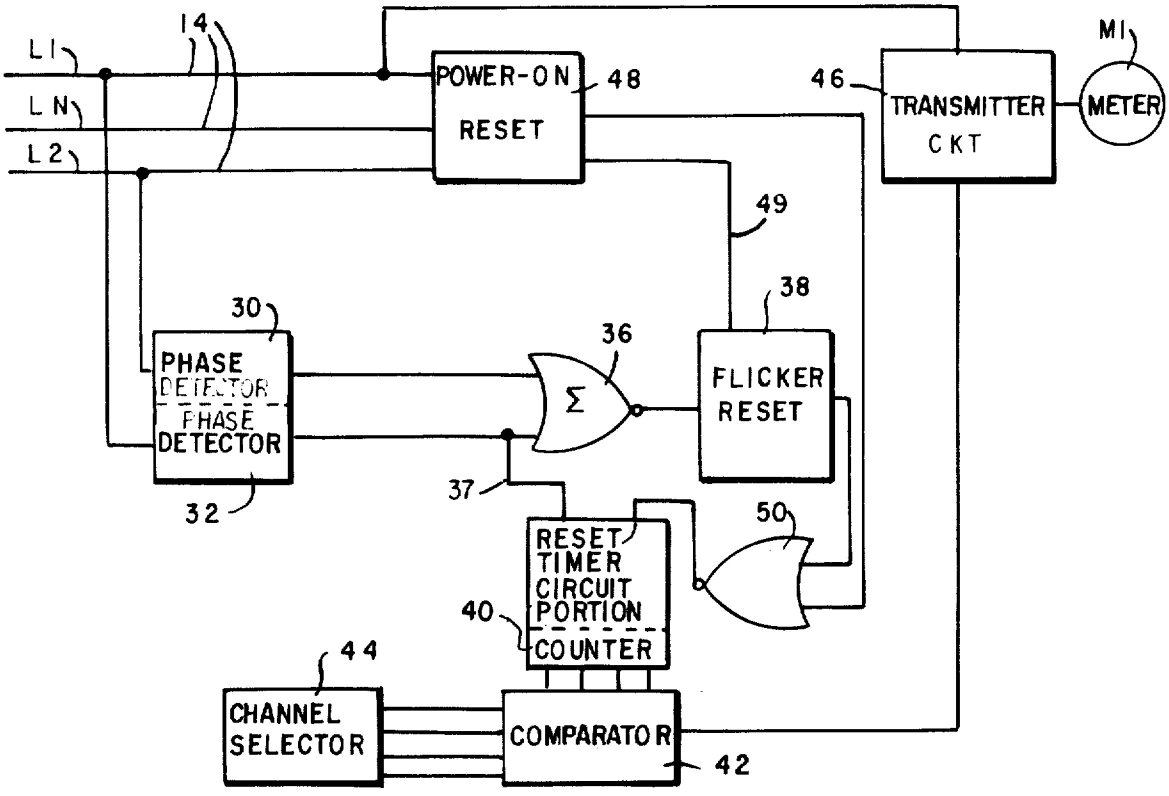
FIG. 2 is a schematic of a transmitter shown in FIG. 1.
Figure 3:
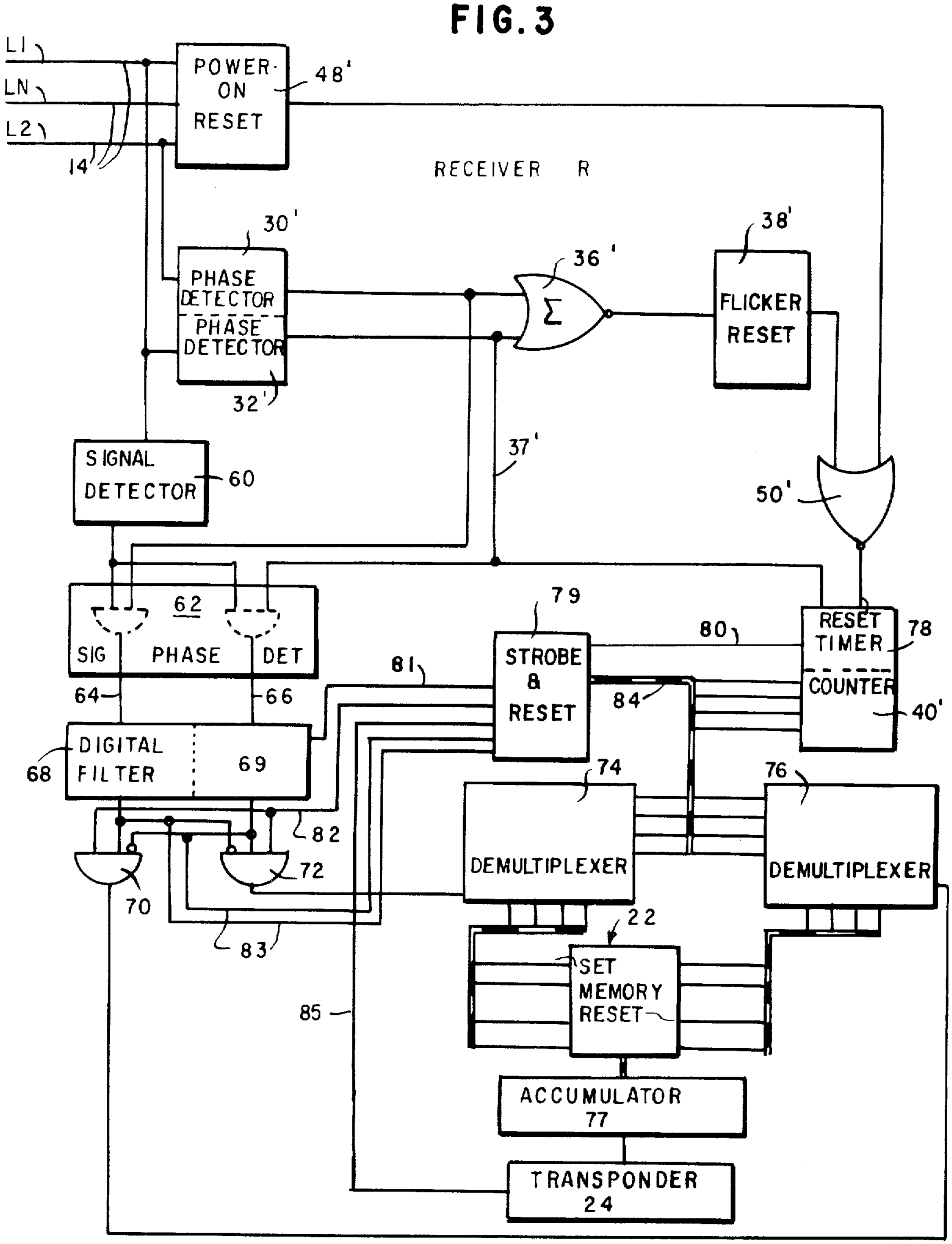
FIG. 3 is a schematic of a receiver shown in FIG. 1.
Figure 4A:
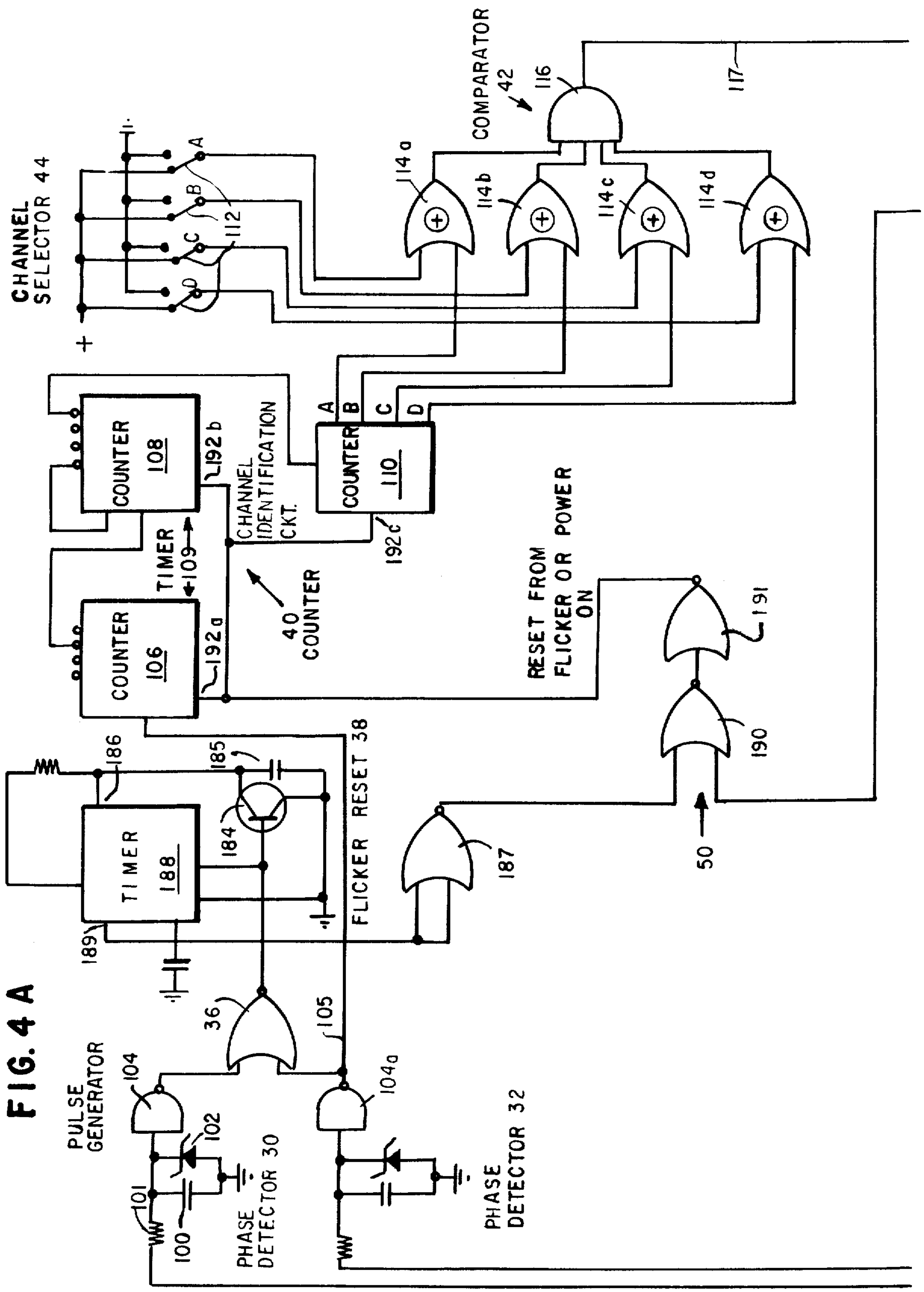
Figure 4B:
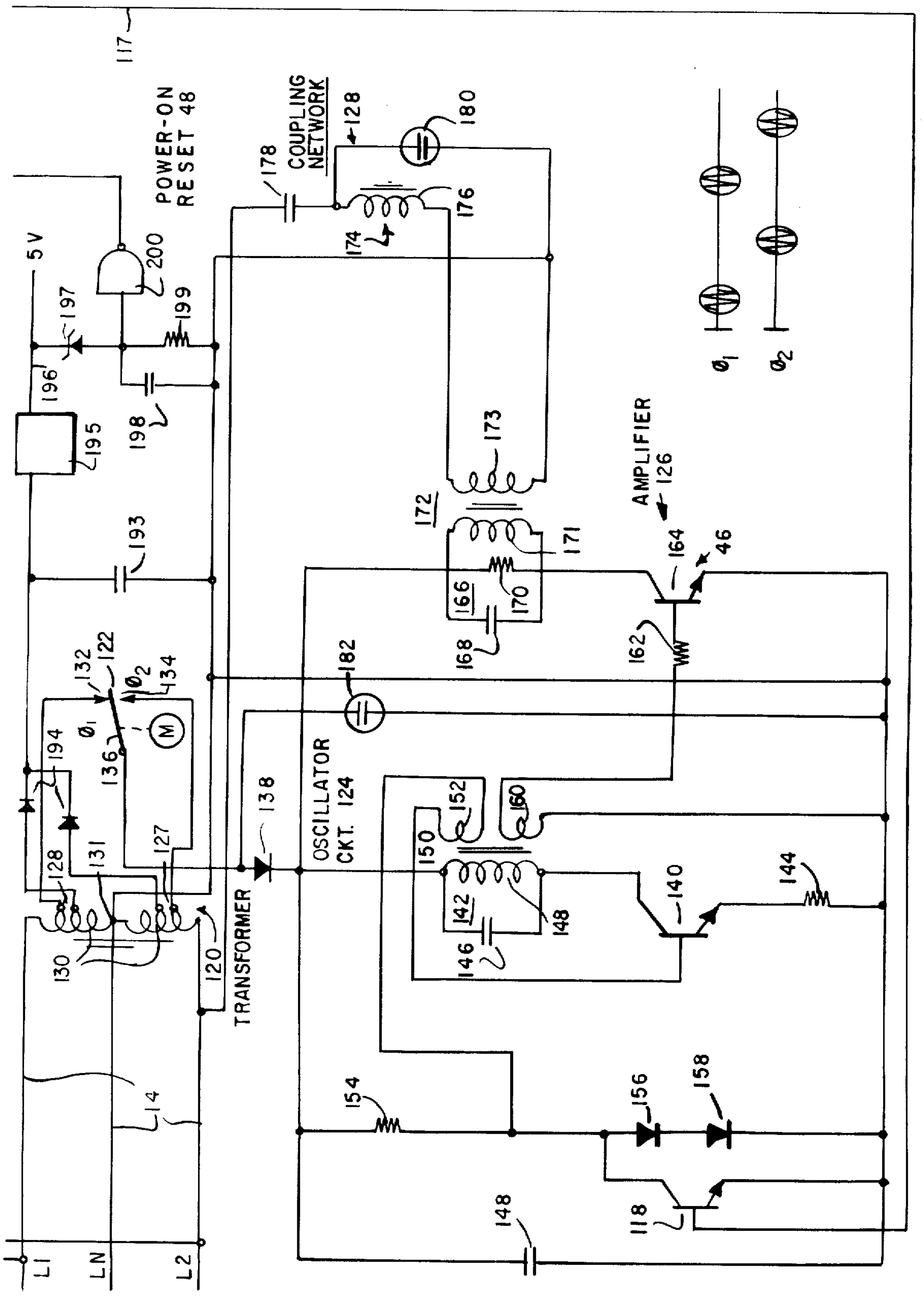
Figure 5A:
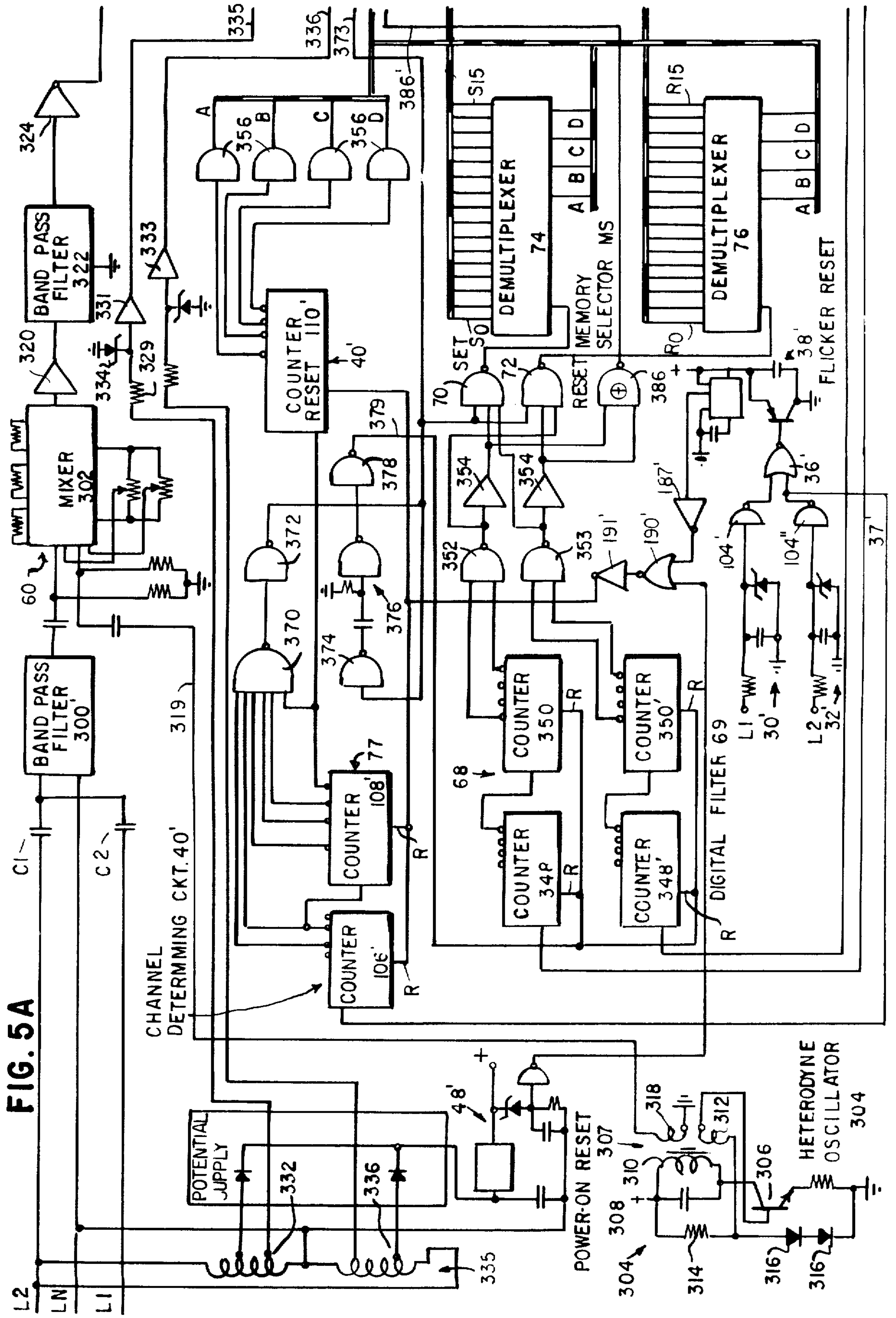
Figure 5B:
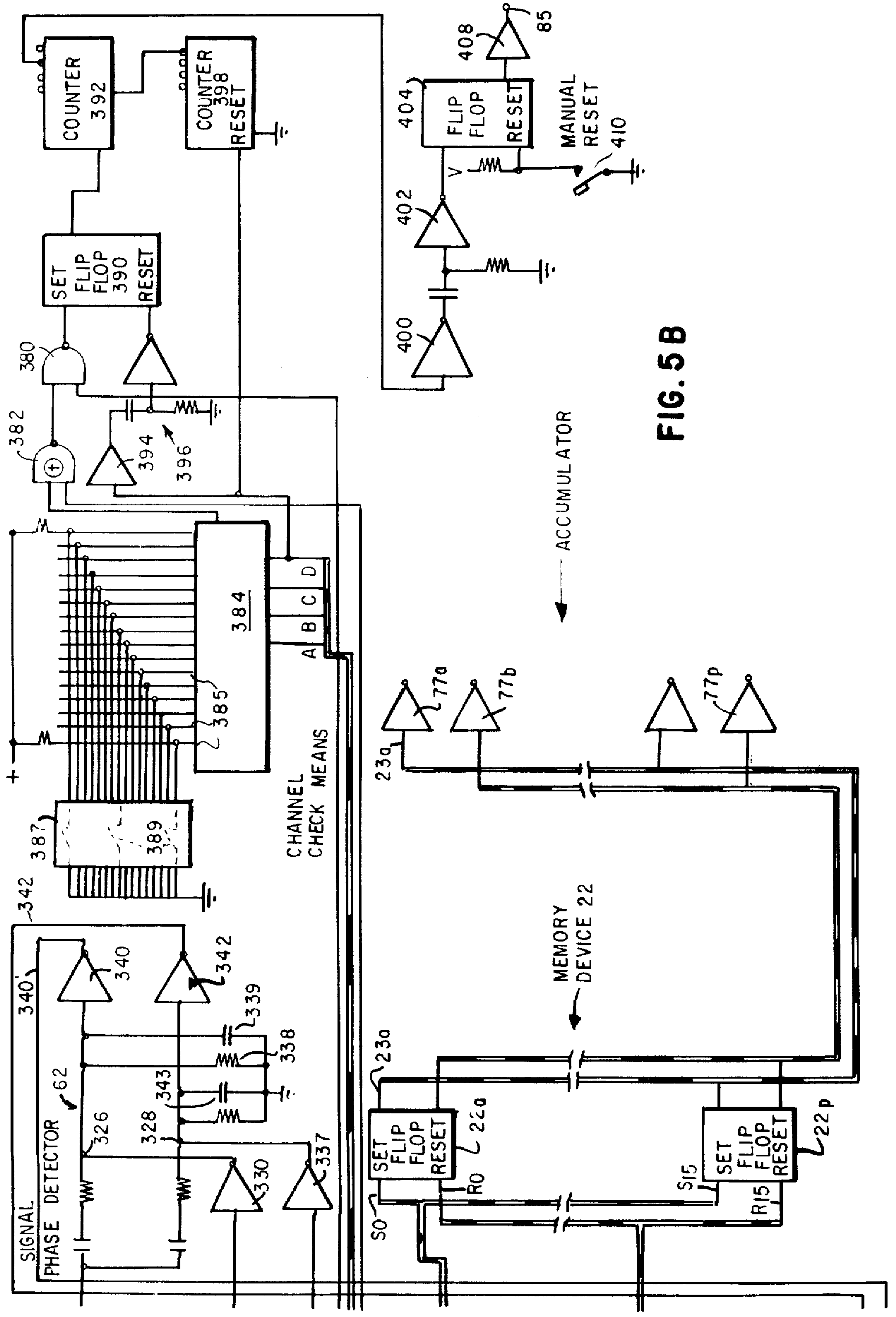

FIGS. 4A, 4B set forth a more detailed schematic of the transmitter shown in FIG. 2; and FIGS. 5A, 5B set forth a more detailed schematic of the receiver shown in FIG. 3.

DESCRIPTION OF THE PREFERRED EMBODIMENT

Figure 1:
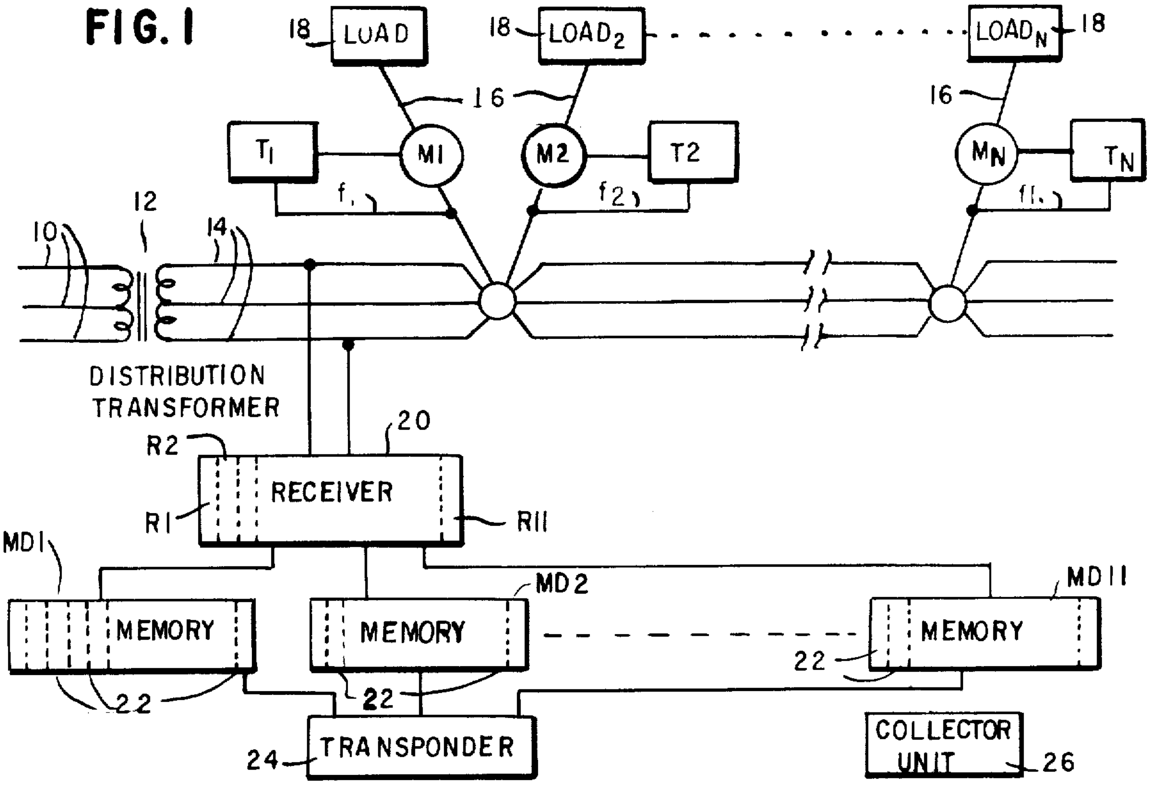
FIG. 1 is a schematic of the system.

A preferred embodiment of the system is shown in FIG. 1 for use with an electric power distribution network of conductors. As is known with such networks, electric power is supplied from a main set of conductors 10 across a distribution transformer 12 to local distribution conductors 14 from which a plurality of service mains 16 draw power for individual loads 18 connected to the service mains. Generally each load 18 is an individual consumer charged for the power carried to him over his service main. Meters M1 through MN in each service main 16 measure the power carried in the service main to the consumer. As before described, these meters are traditionally read manually and the meter readings later processed for billing the consumer.

In the system of the preferred embodiment transmitters T1 to TN are connected, respectively, to each meter M1 to MN for providing output signals from the transmitters which represent each successive increment of the meter measurements. In one exemplary embodiment, the transmitters are grouped in 11 groups of 16 transmitters each, each group of transmitters generating signals at a different one of 11 different frequencies. Each transmitter in each group is enabled to generate its output signal only during a selected channel in periodic time intervals or frames discrete from channels selected for each of the other transmitters in the group. Only one transmitter in a group then generates a signal at any one time. The signals from the transmitters are carried on the service main and along the connected local distribution conductors to a receiver 20 connected to the conductors 14.

The receiver 20 detects the transmitter signals and has means synchronized to the different time channels selected for each transmitter signal for directing the detected signals to a different one of memory devices 22 assigned to the meter-transmitter from which the signal was received. In the specific preferred embodiment having 11 groups of 16 transmitters each, each group of transmitters having a different signal frequency, the receiver 20 comprises 11 receivers R1-R11 each tuned to one of the 11 transmitter signal frequencies. Each of these receivers is connected to a different set of the memory devices MD1-MD11, each set of devices then being assigned to the transmitters of a different group. The synchronized directing means of each receiver R1-R11 then directs the signal from each transmitter in the group to which it is tuned to one of the memory devices 22 in the set of devices connected to the receiver.

Each memory device 22 is connected to a transponder 24 which responds to interrogating signals from a unit 26 for reading the stored meter measurement signals and transmitting each reading to the unit. The transponder is generally of the type described with reference to the patent to Brunner.

Both the transmitters and receivers have means synchronized to phases of the power on the power distribution conductors to which they are connected for selecting the channel during which signals from each transmitter are enabled and for synchronizing the receiver signal directing means to the power phases. Since the transmitter signal and receiver directing means both are synchronized to the phases of the power on the same conductors, they are synchronized to each other. Each one of a plurality of memory devices is assigned to store the data encoded on the signal output by an assigned different one of the transmitters.

The preferred embodiment just described fulfills the object of the invention by providing signals from each transmitter in a group to a receiver tuned to the frequency of the signals from the transmitters in the group only during different, selected time intervals or channels for each transmitter in the group. Since only one transmitter in each group transmits a signal at any one time, the receiver can detect a signal from only one transmitter during each time interval.

Each of the transmitters T1-TN, receivers 20 and memory devices 22 in the preferred embodiment operate in the same way and, therefore, only one of each need be described. Turning first to a transmitter, FIG. 2 shows a generalized schematic of one transmitter. One pair L1, L2 of the conductors 14 is connected to each of two, similar power phase detectors 30 and 32, each of which operates to detect one phase of the power on the conductor to which it is connected. Typical line conductors 14, separately designated L1, LN, L2, carry a sinusoidal power waveform. The waveform on each conductor L1, L2 relative to LN then comprises alternate half-cycle phases of opposite potential polarity; however, the waveform on each conductor is 180° out of phase with that on the other. The similar phase detectors 30 and 32 then alternately detect the similar, but alternate phases of the power on the conductors L1, L2.

The phase detectors 30 and 32 then respectively output square wave pulse signals to OR gate 36, which sums the alternately phased pulse signals to provide a common train of pulses to a power-flick reset device 38. One of the pulse signals is also provided over line 37 to a cyclic counter 40 for incrementing the counter. Since each phase detector 30 and 32 detects one half-cycle of the power on the connected one of the line conductors 14, the pulse from each of the pulse detectors 30, 32 is synchronized to each whole cycle of the power on the line conductors. The count in the counter 40 thusly provides a measured time increment which is synchronized to the power on the line, and as will be shown provides a channel identification signal for each of a plurality of discrete channels provided in each cycle of the counter.

Each channel identification signal provided by counter 40 is fed to enabling means which include a comparator 42 and a channel selector 44. Channel selector 44 basically comprises switch means for preselecting one of the channels for use in the transmission of signals in each cycle. With the coincidence of the channel identification signal and the signal representing the preselected channel, the comparator sends an enabling signal to a transmitter circuit 46. Encoder means in transmitter circuit 46 are then enabled to generate signals of a preassigned frequency to represent measurements made by an associated meter device such as, for example meter M1. The encoded signals are transmitted over power line conductor L1, L2, LN as the case may be to associated receiver equipment.

Since the exemplary embodiment has 16 transmitters in each group, only 16 time intervals or channels are necessary to provide a selected, discrete channel for each transmitter in each group of the embodiment. Accordingly, the channel selector 44 has means for identifying 16 different channels which, in binary code, requires the illustrated four leads connected to the comparator. The full cycle count of the counter 40 is also set at 16, so that each increment of the counter corresponds with one of the identified channels in channel selector 44.

The channel selector 44 for each transmitter in each group is preset to identify a different one of the channels by providing a different one of the possible channel identifying signals to the comparator. The counter increment in each cycle of the counter corresponding to the preset channel identification signal will then satisfy the comparator to enable the transmitter. For example, the channel selector of one transmitter may be set to identify channel 2, a 0010 signal in binary notation, which will satisfy the comparator at each second increment in the cycle of counter increments. Since the usual power line conductor carries power at 60 Hertz, the counter conveniently divides the 60 Hertz power cycles by about 60 to increment the counter 40 about once per second. Each channel is then an interval of about one second duration extending over about 60 cycles of the power on the conductors.

The power line conductors 14 are also connected to a device 48 for detecting substantial interruptions in the power on the conductors. The device provides a signal after power has been restored to the conductors. This signal is carried through OR gate 50 and to a reset port of the counter 40. A signal to the reset port of counter 40 resets the counter to a predetermined count, for example 0.

However, if the power on the conductors 14 should be momentarily interrupted or flicker, the power-on reset device 48 will fail to detect the power flicker. Therefore the power-flicker reset device 38 is provided. When the power on the conductors L1, L2 does flicker, the first absent halfcycle of the discontinued power will not be detected by the phase detectors 30 and 32 which will then not produce a responsive output pulse. The pulse not produced by the detector will not appear in the pulse train summed by the OR gate 36 to provide a discontinuity in the pulses of the train carried to the flicker reset device 38. The flicker reset device 38 will detect the missing pulse and provide a signal through the OR gate 50 to the reset port of the counter 40 to reset the counter.

The flicker reset device 38 derives its operating power from the conductors L1, L2 via the power-on reset circuit 48 and conductor 49. Long power interruptions to the power-on reset circuit (i.e. more than several successive halfcycle's duration) will thus also interrupt the power to the flicker reset device 38 and prevent its operation. The power-on reset device 48 operates to reset counter 40 after power has been restored to the conductors 14. Therefore, after a power interruption, and a brief time delay the power is restored to line 49 by the power-on reset device 48 and thus to the flicker reset circuit 38.

The reset devices are designed to maintain operation of the flicker reset device 38 for a predetermined interval following power interruption and the power-on reset device 48 is conditioned with return of power to reset the counter 40. Since each of the transmitters has similar reset devices 38 and 48, each of the counters 40 in each of the transmitters will be reset at each power interruption to maintain synchronism between the channels of each of the transmitters.

Turning now to the one of the similar receivers illustrated in FIG. 3, each receiver is seen to have several components similar to those of the transmitters for performing similar functions. These components include power conductor phase detectors 30' and 32' connected to the power line conductors L1, L2 for detecting alternate half-cycles of the power on the conductors and for responsively outputting pulses summed by an OR gate 36' to provide a pulse train to a flicker reset device 38'. In addition each receiver has a power-on reset device 48' which provides a reset signal after each substantial interruption of the power on the conductors. The reset signals from each device 38' and 48' are provided through an OR gate 50' to a reset port of a counter 40'. The counter 40' is also connected via conductor 37' to receive output pulses from one of the phase detectors for incrementing the counter 40' once each cycle of the power on the conductors 14. Since all these components have the same structure for performing at least the same functions as the equivalent components just described with reference to the duplicated functions. However, the counter 40' performs functions in the receiver additional to those performed by counter 40 in the transmitter, and is later described with reference to these functions.

The receiver also has a signal detector 60 connected to the conductors 14 for detecting the encoded signals from transmitter oscillator 46 and all the other similar transmitters of the group transmitting at the same frequency. It should be recalled at this point that each of the similar receivers R1 through R11 receive the signals from one of 11 groups of 16 transmitters, each group of transmitters providing signals at a different frequency, each transmitter in each group providing its signal at a different time interval or channel, and each signal from each transmitter being encoded to represent the increments of measurement of a meter connected to the transmitter.

The detected signals are then, in effect, gated by a signal phase detector 62 which is also responsive to the half-cycle phases of the power on conductors L1, L2 as indicated by the pulses received from the phase detectors 30', 32' to assign the detected signals to one of two paths 64 and 66 depending upon the phase of the power at which the signal is detected, it being recalled that signals received during different phases of the power represent correspondingly different data provided by the meter associated with the transmitter generating the signal. For this purpose, the signal phase detector 62 is illustrated schematically as a pair of AND gates, each receiving the detected transmitter signals from signal detector 60 and the phase-indicating pulse signals from the phase detectors 30, 32. This schematic illustration will later be understood to represent the function of other circuitry more precisely described with reference to FIG. 5. The signals in each of the paths 64 and 66 are then integrated in digital filters 68, 69, and provided, respectively, to input ports of AND gates 70 and 72. A signal to either of the AND gates 70 or 72 is also provided to an inhibit port of the other gate to permit only one of the gates 70 and 72 to provide an output signal at any one time.

Returning to the counter 40', this counter as with the counter 40 in the transmitter, counts phases of the power on the conductors L1, L2 to provide 16 separate channel signals of approximately 1 second duration synchronized to the power on the conductors L1, L2. Since both the transmitter and receiver are synchronized to the power on the conductors L1, L2, a signal received during any one of the 16 channel intervals counted by the counter 40' will correspond to the signal from only one of the transmitters. Thus the signal detector 60 for a receiver is tuned to receive signals at the frequency which is assigned to such receiver and its associated transmitter group. Signal phase detector 62 in the receiver detects the phase of the signals received and with the digital filter 68, 69 provides signals which represent the data provided by the meters associated with such transmitters. Counter 40' identifies the channel during which each of the detected data-representing signals is received and thereby the one of the transmitters in the group which transmitted such signals.

Each of the channel identifying signals from the counter 40' is provided to each of two demultiplexers 74 and 76 to set the devices to provide an output signal at a port corresponding to the identified channel. Each of the devices 74 and 76 is enabled to provide such an output signal only by a signal from one of the AND gates 70 and 72 connected, respectively, to the devices. Therefore, one of the demultiplexer ports identified by the channel number from the counter will carry an output signal when, and only when, the demultiplexer is enabled by a signal from the connected one of the AND gates identifying the state of the meter as represented by the phase of the detected signal.

Each of the ports of each of the demultiplexers 74, 76 is connected respectively to a set or reset port of a discrete device 22*a*–22*p* (FIG. 5) in memory device 22 for storing each successive demultiplexer output signal from the port connected to the device. Since the signal at each port represents a signal from a transmitter identified by its frequency and channel, and has a phase encoding which represents the state of the encoding switch at the meter connected to the identified transmitter, the signal provided to each memory device then also represents the state of the encoding switch or with each change in state an increment of measurement of the meter is stored. That is, the encoding switch changes state with each meter increment to change the state of the signal in the associated one of the memory devices. The successive changes of state of each memory device 22*a*–22*p* are then discretely accumulated in accumulator memory device 77 to represent the measurement of each meter. Accumulator memory device 77 may be of the type disclosed in the above identified application.

A timer circuit portion 78 of the counter 40' signals a strobe and reset device 79 over line 80 to cause the device 79 to reset the digital filters 68, 69 with a signal over line 81. The strobe and reset device 79 also sends a strobe signal to the gates 70 and 72 over line 82 near the end of each time interval determined by the timer circuit portion 78 to strobe the data in one digital filter through the connected gate to the demultiplexer 74 or 76 connected to the digital filter. Specifically, the strobe and reset device 79 strobes the data through the gate 70 or 72 during the 62nd step which occurs in a 1 second power interval on the conductors L1, L2 and resets the digital filters during the 63rd step as counted by the timer circuit portion 78. The device 79 also determines from signals on lines 83 the simultaneous occurrence of signals of alternate phase, (an evident anomaly), and compares the successive channels with a preset list of channels "in" service, (i.e. channels during which a transmitter then in the system is set to produce data signals), to determine if a signal on lines 83 occurs during an "in" service channel. For this function, the strobe and reset device 79 receives the channel identifying signals from counter 40' over cable 84 for identifying the channels during which the signals on lines 83 are received. Since this last function discovers inappropriately detected signals rather than preventing the inappropriate detection of signals as with the former functions, the device 79 responds with an error signal to the transponder over line 85.

Finally, the data accumulator 77 is intermittently cycled by associated switching equipment to output signals to the transponder representing the accumulated signals from each transmitter. Since the accumulated stored signals in the accumulator 77 represent the meter measurements, this operation effectively reads the meters. If the particular types of malfunctions described have occurred, the output from the transponder 24 will so indicate.

MORE DETAILED TRANSMITTER DESCRIPTION

FIGS. 4A, 4B show a more specific schematic of the transmitter of the preferred embodiment. In FIGS. 4A, 4B the conductors 14 of the power distribution system are specifically identified L1, LN and L2, traditional nomenclature for, single-phase distribution conductors, with the lines L2, LN indicated as carrying the transmitted signals. It is initially noted that the power phase detectors 30 and 32 are connected to the conductor pairs L1, LN and L2, LN, it being recalled that the power on these conductors is assumed to be 180° out of phase with each other, to permit similarly constructed phase detectors 30 and 32 to effectively detect alternate phases of the power on either of the conductors. Accordingly, only one detector 30 will be described, it being understood that the other detector 32 operates similarly.

The phase detector 30 comprises a resistor 101 connected in series with the conductor L1, a parallel capacitor 100 and Zener diode 102 connected between the resistor 101 and ground and a Schmitt trigger 104 connected in series with the resistor 101. As each half cycle of power occurs on line L1, the increasingly positive potential on the connected conductor L1 as stepped down by the potential drop across resistor 101 is fed to capacitor 100 which charges until the Schmitt trigger 104 fires to provide an output pulse to OR gate 36. During the negative half-cycle of the potential on the connected conductor, the Schmitt trigger 104 is cut-off and then continues non-conducting until sufficient positive potential from a next succeeding positive half-cycle of the potential from the connected conductor again fires the trigger 104. The Zener diode 102 serves to protect the transmitter by breaking down under excessive potentials from the conductor L1 to ground-out the excessive potential. The next negative half-cycle of the power resets the Zener 102 for continued transmitter operation.

Phase detector 32, being connected to line L2 is operated in like manner on each negative half-cycle to output a pulse over Schmitt trigger 104A to OR gate 36.

As the potential on conductors L1, L2 alternates at 60 Hz., the pulses from each phase detector 30 and 32 are also output at 60 Hz. The pulses from trigger 104A are also carried on line 105 to the counter at 40, now shown to be comprised of three, 16 bit, serial counters 106, 108 and 110 which may be of the type designated SN74L93N and commercially available from Texas Instruments Corporation. Each of the counters 106, 108, 110 is series connected to the counter of the preceding stage, the counters 106 and 108 being connected to count every 4th and every 16th pulse, respectively, to divide the number of pulses from the connected phase detector 32 by 64, thereby forming a timer circuit portion 109 of the counter. The resulting pulses at approximately 1 Hz. are provided to the counter 110 which counts each pulse to provide a binary signal on the four output ports A, B, C, D. The approximately 1 second interval of time of each pulse as determined by the timer circuit portion 109 thereby establishes a correspondingly defined one of the time interval channels for the transmitter.

The channel selector at 44 is now shown to be a series of double throw switches 112, each of which may be independently set to connect an output terminal of the switch to either a logic zero or a logic one potential. The resulting combination of logic potentials at the four terminals again represents, in binary, a number from 1 to 16. Each of the 16 transmitters in a group providing a signal at one of the 11 frequencies selected for the group, has its channel selector switches set to a different combination of positions thereby identifying a different number between 1 and 16 for assigning a different one of the channels to each of the transmitters.

To enable such operation of each transmitter, the coded logic potential signals from the channel selector switches 112 are each provided to one input port of one of four exclusive OR gates 114 while another input port of each gate 114 is connected respectively to one of the four output ports of the counter 110. When the signals to each of the input ports of each exclusive OR gate 114 correspond, the OR gates 114 each provide a high logic level output signal, i.e. in the transmitter shown in FIG. 4A, each selector switch 112 is set to logic 1 to provide four logic 1 bits 1111, which preset transmitter 16 of the group of sixteen transmitters. When the counter 140 advances to the count which represents the 16th channel (ABDD=1111) each of two OR gates 114 output a high level signal. Each of these signals is provided to an input port of a NAND gate 116 which, upon a receipt of a high logic level signal from each of the exclusive OR gates 114, provides a low logic level output signal. These gates 114 and 116 thus form the comparator 42.

The low logic level signal from the NAND gate 116 is provided to the base of a transistor 118 to cut-off conduction of the transistor. The transistor 118 serves as an enabling switch for enabling operation of an oscillator at 46 of the transmitter. The oscillator is generally similar to that described in the above identified copending application. It has an autotransformer 120, an encoder switch 122, a tuned oscillator circuit 124, an amplifier 126, and a coupling network 128.

A winding 130 of autotransformer 120 is connected across conductors L1, L2 which provide, in the usual power distribution system, 110 volts, 60 cycle AC power to the transformer 120. The output of transformer winding 130 comprises opposite potential signals as measured between a center tap 131 connected to conductor LN and taps 127, 128 toward each terminal end of the winding. Tap 127 is connected to a fixed contact 134 and tap 128 is connected to a fixed contact 132. A movable arm 136 of the encoder switch 122 is moved between contacts 132 and 134 by the meter M as it measures successive units of, for example, electric power consumption. The encoder switch, in effect, comprises a single-pole, double throw switch alternatively connecting the secondary winding to provide a signal of different phase over the movable arm with each change of position of the arm in response to unit increments of measurement by the meter, the center tap 131 providing a ground reference for the signals, and the phase of the power on source conductor pairs L1, LN and L2, LN, Providing a phase reference for the signals output over the movable arm as the arm engages contacts 132 or 134. Stated in another manner, with the arm 136 moved into contact with the upper terminal 132, the signal output from the transformer winding as referred to conductor LN is of a first phase, and with arm in contact with the lower terminal 134, the signal output from the winding as referenced to conductor LN is displaced 180° from the first phase.

In one embodiment, a movement of arm 136 was effected to provide a phase reversal for each measurement of one-half Kilowatt hour units by an electric watthour meter. Various types of encoder switches 122 may be provided to effect such phase reversal. Reference is made, for example, to one form of switch which is shown in U.S. Pat. 3,700,839 issued on Oct. 24, 1972, in the names of Donald A. Eggleston and Trevor N. Samuel and connected as shown in FIG. 4 hereof.

The phase-oriented signal output provided by movable arm 136 is connected over rectifier 138 to the tuned oscillator circuit 124. In that recitifier 138 conducts only during each positive half-cycle of the power on conductors L1, L2, the output of rectifier 138 with the arm 136 in contact with the upper contact 132 will be as shown be the waveform 01, and with the movable arm in contact with the lower contact 134, as shown by the waveform 02, displaced 180° from the phase of the 01 signals. Thus, positive potential signals of two different phases are fed to the tuned oscillator circuit by the encoding switch, the position of the movable arm indicating the phase of the applied signal.

The tuned oscillator circuit basically comprises a transistor 140 and a tank circuit 142 which is tuned to effect oscillation of transistor 140 at 80 KHz. Each of the oscillators for the transmitters of the other 10 groups of transmitters will of course be tuned to a correspondingly different frequency. The transistor 140 has an emitter connected over resistor 144 to reference ground, the center tap of transformer secondary winding 130, and a collector element connected through the tank circuit 142 which includes a parallel-connected tuning capacitor 146 and primary winding 148 of inductance 150 to the output of rectifier 138.

A first secondary winding 152 on inductance 150 is connected at one side in a feedback mode to the base of transistor 140, and at the other side to a voltage divider comprised of resistor 154 and diodes 156 and 158 connected across the rectifier 138 to provide a slightly positive bias voltage over the feedback circuit, approximately one volt in the present embodiment, to bias transistor 140 into conduction when, as explained, transistor 118 is cut off. A decoupling capacitor 148 is connected across the voltage divider.

A further secondary winding 160 on inductance 150 supplies the 80 KHz phase oriented signals from the oscillator over a current limiting resistor 162 to a base element of a transistor 164 which is connected as a Class C amplifier in amplifier circuit 126. An emitter of transistor 164 is connected to reference ground, and the collector element is connected through a tank circuit 166 to the output of rectifier 138. Tank circuit 166 includes a parallel-connected capacitor 168, resistor 170 and winding 171 which is the primary winding of an adjustable inductance 172 and is tuned to resonate at the same frequency (80 KHz) as the oscillator tank circuit 142. The windings of inductance 172 are selected so that the tank circuit 166 is broadly tuned, whereby possible frequency drift of the oscillator circuit 124 will not seriously affect the power output of the transmitter. Inductance 172 may be adjusted by a slug to assist in tuning of the tank circuit 166.

Secondary winding 173 of adjustable inductance 172 is series-connected across the lines L2, LN with a series resonant circuit 174 which includes inductance 176 and capacitor 178. The coupling network 128 including series resonant circuit 174 is important to the invention in that such circuit makes it possible to the effect unilateral transmission of the relatively low power output signals of the transmitter over the power distribution conductor i.e., the 120 volt power across conductors L2, LN must be isolated from the 1 volt, 80 KHz output of the transmitter.

Surge protection for the output circuit of the transmitter including inductance 173 and series resonant circuit 174 is provided by a neon bulb 180 (commercially available as NE-2 and rated at 65 volt breakdown). A second similar neon bulb 182 is connected between a cathode of rectifier 138 and the center tap of the secondary winding 159 of transformer 101.

The values of the components in one embodiment of a transmitter operative at 80 KHz are set forth hereat:

| | |
|---|---|
| Rectifier 138 | 1N4383 |
| Transistor 140 | 2N5830 |
| Resistor 144 | 100 ohms |
| Inductance 150 | 384 NH (Nominal) |
| Primary Winding 148 | 91 turns, 10–42 Litz |
| Secondary Winding 152 | 2½ Turns, 10–42 Litz |
| Secondary Winding 160 | 5 turns, 10–42 Litz |
| Capacitor 146 | .0104 MFD (For 80 KHz) |
| Diodes 156, 158 | DA 111 |
| Resistor 154 | 3300 ohms |
| Capacitor 148 | .47 MFD |
| Resistor 162 | 180 ohms |
| Transistor 164 | MPS-U06 |
| Inductance 172 | 181 MH (Nominal) |
| Primary Winding | 62 turns, 15–42 Litz |
| Secondary Winding | 3 turns, 15–42 Litz |
| Capacitor 168 | .02 MFD (For 80 KHz) |
| Resistor 170 | 560 ohms |
| Inductance 176 | 39 Microhenries<br>29 turns, 10–38 Litz |
| Capacitor 178 | .1 MFD |

In describing the counter at 40, comparator 42 and channel selector 44 it was noted that the position of the channel selector switches 112 selects a specific channel interval from successive interval-defining pulses received by the counter 110. Each of the individual transmitters will operate satisfactorily in this manner. However, to assure that each of the counters 110 in each of the transmitters in each of the transmitter groups will provide a signal at a unique channel within each transmitter group, it is necessary to synchronize each of the counters 110 in each of these transmitters to each of the other counters in the transmitters of the group so that each channel interval pulse counted in each of the counters 110 represents a unique channel. This synchronization is achieved by setting each of the counters 110, and the preceding timer circuit portions 109 of counter stages 106 and 108, simultaneously to a selected initial count, conveniently the count of the channel identified as 1. Each of the counters has a reset port 192 responsive to a signal for so resetting the counters. But if an interruption in the power occurs, synchronization between the counters in the several transmitters will be lost to destroy the uniqueness of the channel of each transmitter signal.

This problem is overcome by power detectors now to be described. A first of the detectors, the flicker reset 38, has an inverting OR gate 36 for summing the pulses generated by each of the Schmitt triggers 104, 104A. It will be recalled from the earlier description that each of the Schmitt trigger pulses represents alternate half-cycle phases of the power. Since the pulses from the Schmitt trigger 104 represent alternate half-cycles of the power, the width of the triggered pulses may ideally provide, after summing in OR gate 36, a substantially continuous potential signal with instantaneous demarcations between the successive pulses forming the signal. In practice, of course, small spikes will drop from the potential signal between successive pulses as required for the rise time of the Schmitt triggers 104 and OR gate 36. However, the summed pulses from the OR gate 36 are sufficiently continuous to maintain transistor 184 conduction and capacitor 38 discharged to thereby prevent timeout of timer 188.

However, a missing half-cycle of the power omits one pulse to initiate operation of the timer 188. That is transistor 184 is switched off and capacitor 185 connected across the emitter-collector junction of the transistor 184 charges to a bias potential that triggers timer 188. The device 188 then times out to provide a signal at its port 189 which is carried to an OR gate 190 after appropriate inversion by an inverter 187. One such device 188 is commercially designated NE555.

The signal thus provided to the OR gate 190 identifies one or more missing half-cycles of the power on the connected conductor. This signal to the OR gate 190 is then inverted by an inverter 191 and provided to the reset ports 192 of each stage of the counter 40, viz. counters 106, 108 and 110. Each stage of the counter 40 is then reset to its zero count. Since the pwoer on the lines is carried to each of the transmitters, the counters in each of the transmitters in this system will similarly respond to a omitted half-cycles of the power to reset each of the counters to its zero count. Thus, each of the counters will be synchronized at the next succeeding half-cycle of the power.

Power interruptions of substantially more than a few half-cycles duration present additional problems; specifically the power for operating the transmitters, including the flicker reset device 188 is derived from the conductors experiencing the detected power interruption. Power for resetting the counters from the device 188 is then ultimately lost, the device 188 having means for storing counter resetting signal power for only several successive half-cycles of power interruption. Accordingly, it is desirable to additionally resynchronize the transmitters after a power interruption of more than the several, successive half-cycle's duration.

For this purpose a power-on reset device 48 (FIG. 4B) is provided. For this device, a filter capacitor 193 is connected between tapped portions of the transformer winding 130 in the transformer 120 and ground, and a pair of diodes 194 between the capacitor and transformer rectify the alternating, oppositely phased potential in each tapped portion of the winding to provide a filtered DC potential supply to a voltage regulator device 195. One such device 195 is commercially available as a LM 340-5. The device 195 provides a regulated DC output potential on lead 196 which is used as a bias supply for other transmitter components. The regulated bias potential on lead 196 also breaks down a Zener diode 197 to charge a capacitor 198 in parallel with a resistor 199. The capacitor 198 provides a logic one input to an inverting Schmitt trigger 200 which then provides a logic zero to OR gate 190 connected through inverter 191 to the reset ports 192*a, b, c* of the counters 106, 108 and 110.

During a power interruption, no potential is provided from the transformer to device 195. The capacitor 198 then discharges through resistor 199 to interrupt the logic zero signal which is normally output by the Schmitt trigger 200. When power is restored to the conductors, the device 195 again provides the bias potential to lead 196 to break down Zener 197 causing its conduction to the capacitor 198 and parallel resistor 199 between the Zener and ground. The resulting positive potential to the Schmitt trigger 200 again triggers a logic zero output to connected OR gate 190. As with the flicker reset detector, this input to the OR gate 190 provides a reset signal to the counter 40. However, this reset signal required the power to be restored to the conductors after the interruption until sufficient potential is again built on capacitor 198 to fire the Schmitt trigger 200. Capacitor 198 thus times the delay of the reset signal after power restoration.

OPERATION OF THE TRANSMITTER DESCRIBED IN DETAIL

Having now described each component of the detailed schematic of the transmitter shown in FIG. 4, the operation of the illustrated transmitter can be described. With a steady state of the power on the conductors 14, the detectors 30 and 32 detect half-cycle phases of the power on two of the conductors L1, L2, each with reference to LN, which are 180° out of phase with each other. Schmitt triggers 104 in the detectors respond to the phases with oppositely phased pulse signals. These pulse signals then represent alternate half-cycle phases of the power, usually 60 Hz., 115V AC, so that each Schmitt trigger provides a 60 Hz. pulse train. The pulse train from one of the Schmitt triggers 104 is carried to counters 106 and 108 forming timing circuit portion 109 of counter 40 which divide the pulse train by 64 to provide an approximately 1 Hz. output pulse signal. Each pulse of this signal is counted by a further counter 110 to provide successive, cyclic binary indication of each of the counted pulses for defining time intervals or channels between counted increments (i.e., 0000 on ABCD to identify channel 1; 0001 on ABCD to identify channel . . . to 1111 on ABCD to identify channel 15). The defined channels are compared with the binary signals which are preset on channel selector switches 112 in each transmitter, the different transmitters having different settings in accordance with the channel to which it is assigned. The channel selector switches 112 for the transmitter shown in FIGS. 4A, 4B are set to . . . 1111 . . . and the illustrated transmitter accordingly enabled during the sixteenth channel of the sixteen channels generated in each cycle.

More specifically, comparator 116 is enabled only upon coincidence of each of the four signals output from counter 110 with the four signals provided by channel selector 44 to each of the exclusive OR gates 114*a–d*. With such occurrence inverting AND gate 116 connected to OR gates 114a-d outputs a signal over path 117 to block normal conduction of a seitching transistor 118. With transistor 118 nonconducting, a secondary winding 152 on transformer 142 is biased to permit signals to be output from the oscillator circuit 124 over the power conductors L1, LN, or L2, LR, in accordance with the position of switch conductor 136.

Summarily, it is seen from the foregoing description that the preset channel selector 44 in each transistor enables the transmitter to output signals in only the one of the sixteen channels defined by counter 110 which is identified by the preset status of switches 112. It is further apparent that such switches provide a flexible arrangement the same transmitter unit may be used with any meter in the group and in any group by merely adjusting the transmitter oscillator to output signals at the frequency of the selected group, and adjusting the switches 112 to select the channel in such group in which the transmitter is to be used.

As noted above, whenever a transmitter is energized during its assigned channel, the encoder switch 122 in the transmitter causes signals (which are of a frequency assigned to the group with which the transmitter is associated) to be transmitted during one of the two half-cycles of power on one of the power lines (L2 in the illustrated example). With the encoder switch 122 in one position, the frequency output occurs during one half cycle, and with the encoder switch 122 in the other position, the frequency output occurs in the alternate half-cycle.

Each transmitter is synchronized to the power cycles on the conductors L1, L2, LN and reset to a selected one of the power cycles after each substantial interruption in the power by device 195 and related circuitry froming power-on reset device 48. In addition the flicker reset detector 38 comprising device 188 and related circuitry detects half-cycle interruptions of the power on the conductors up to the substantial power interruptions detected by reset device 48. Both of these reset devices provide a reset signal to each stage of counter 40 to reset such counter in each of the transmitters to a preselected starting position, and thereby synchronization of the system.

DETAILED DESCRIPTION OF THE RECEIVER

FIGS. 5A, 5B illustrate in detail a preferred embodiment of each receiver more generally illustrated in FIG. 3. Except as otherwise noted, each of the receivers of the system is the same and therefore only one need be described. In addition, several of the receiver components are the same as those just described for the detailed embodiment of the transmitter. Accordingly, these components need be but briefly described.

Each receiver has phase detectors 30′ and 32′ of the type described in the transmitter shown in FIGS. 4A, 4B connected, respectively, to two oppositely phased power conductors L1, L2 (FIG. 5A, lower center), each of which includes Schmitt triggers 104″, 104″ respectively for providing pulses which represent alternate phases of the power on conductors L1, L2. The pulses from one of the triggers 104′ are fed over OR gate 36′ and conductor 37′ to counter 40′ which operates in the manner of counter 40 in the transmitter, but which also, as will be shown, performs additional functions. One of the triggers 104′ also provides pulses to a power flicker reset device 38′ in the manner of flicker reset device 38 in the transmitter or for resetting the counter 40′ after a power interruption of one or more half-cycles of the power. A power-on reset device 48′ also resets the counter 40′ but does so after power is restored following a substantial power interruption which is of a period sufficiently long to interrupt the enabling power for the flicker reset device 38′. The power-on reset device 48′ is similarly constructed and performs in a manner similar to that of the power-on reset device 48 used in the transmitter, and accordingly no further description of such units is necessary.

Each receiver as shown in FIG. 5A (upper left) is capacitively connected via capacitor C1, C2 to the conductors L1, LN, L2, whereby transmitter signals on the line are passed to the receiver input and the power signals on such lines are blocked from the receivers. More specifically, the transmitter signals on the line L1, L2, LN are fed over capacitor C1, C2 to a band pass filter 300 which detects and passes only those signals which are in the band of frequencies to which the receiver is tuned. For the specific example in which the transmitter group (FIGS. 4A, 4B) provided signals of 80 KHz to the line conductors L1, L2, LN, the associated receiver was equipped with an 80 KHz band pass filter. Signals passed over the filter 300′ are provided to a frequency multiplier or mixer circuit 302, which may be of the type, for example, which is commercially available from Motorola Corporation as an MC1494L unit. A heterodyne unit 304 (FIG. 5A lower left) also supplies a signal via path 319 to the mixer 302.

The oscillator has a transistor 306 connected in series with a tank circuit 307 across a bias potential supply. The tank circuit comprises parallel-connected capacitor 308 and inductive winding 310. A winding 312 inductively coupled to the winding 310 is connected at one side to the base of transistor 306 for controlling conduction of the transistor in a feed-back mode. Potential dividing resistor 314 and diodes 316 connect the other side of winding 312 across the bias supply to positively bias transistor 316 into conduction. As the transistor conducts, the current through the winding 310 applies a reverse potential to secondary winding 312 to cut off conduction of the transistor 316. The reverse potential in winding 312 then falls to again permit the positive bias potential to cause conduction of transistor 316. The frequency of oscillation is controlled by the capacitor 308 and is set to a known frequency other than the frequency which the receiver is to receive. For the illustrative 80 KHz signal, an oscillator frequency of 81625 Hz is preferred. Another secondary winding 318 is inductively coupled to the winding 310 to provide the oscillator frequency signal to the mixer circuit 302. The circuit 302 beats the oscillator frequency against the frequency passed by the band pass filter 300 to provide a signal of a beat frequency which is the difference of the received signal frequency and the oscillator signal frequency, 1625 Hz. in the exemplary receiver. The oscillator 304 and mixer 302 thus serve as a superheterodyne receiver.

In the preferred embodiment, a different receiver receives the different frequency signals from each group of transmitters. For convenient standardization of the design of successive elements of each of these receivers, it is desirable to provide a standard beat signal frequency from the heterodyne portion of each receiver. For this purpose the oscillator signal frequency is adjusted to a constant difference from the transmitter signal frequency to be received by each receiver.

In each receiver, this standard beat signal frequency is amplified by amplifier 320, passed through another band pass filter 322 which passes signals of the standard beat frequency, and again amplified in another amplifier 324 preferably having automatic gain control circuitry. The amplified signals are provided to the signal phase detector 62 which comprises a pair of phase-detecting envelope filters performing the function illustrated schematically by AND gates in the signal phase detector 62 of FIG. 3. In the phase detector, the amplified beat frequency signals are applied to each of two leads 326 and 328. Since each lead 326, 328 is connected to similar devices, the operation of only one set of these devices need be described.

An inverter 330 is connected to lead 326 and receives an input signal indicating alternate phases of the power on one of the conductors, (conductor L2 in the illustrated example). For this purpose a Schmitt trigger 331 is connected to a tap 332 on one side of a winding in a transformer 335, the centertap of which is connected to conductor LN. As the potential tapped from the transformer exceeds the break down potential of associated Zener 334, the Zener grounds the connected Schmitt trigger 331 to protect the trigger. The positive potential of the power cycle as tapped from the transformer fires the Schmitt trigger 331 into the connected inverter 330. The inverter 330 responds with a low logic level signal to line 326. Of course, at the same time, Schmitt trigger 333, being connected to a tap 336 in transformer 335 on an opposite side of the centertap from tap 332, sees an opposite, negative half-cycle of the power on conductor L2 and is not triggered to provide an output pulse. The inverters 330 and 337 thus each provide alternate, low logic level signals to the connected lines 326, 328 in synchronism with the alternate phases of the 60 Hz. power on the connected conductor L2.

The signal output of amplifier 324 is connected over rectifiers R1, R2, respectively, to envelope filters 62′ and 62″. Envelope filter 62′ includes a resistor 322 and a high frequency signal integrator comprised of a parallel connected resistor 338 and capacitor 339, having one end grounded. Envelope filter 62″ includes a resistor 332′ and a high frequency integrator comprised of a parallel connected resistor 343′ and capacitor 343, having one end grounded. The time constants of the envelope filters 62′, 62″ are chosen in relation to the beat signal frequency such that the capacitor circuits will not substantially discharge during the negative half cycles of the beat signal frequency.

Inverters 330 and 337 are enabled as noted above to output high logic level signals in alternate half cycles to conductors 326, 328 in envelope filters 62′, 62″ respectively. For purposes of example, it is assumed the transmitter T is transmitting signals during the one half cycle in which the inverter 330 is outputting a high logic level signal to conductor 326. Accordingly, as the inverter 330 is high during such half cycle the envelope filter 62′ will sum up the positive integrated frequency signals output from amplifier 324 to thereby enable Schmitt trigger 340 to operate for such half cycle.

During the next half cycle inverter 330 clamps line 326 to logic zero, and there will be no signal output to envelope filter 62′ and no output from Schmitt circuit 340.

Continuing with the example, during the first half cycle the signal from inverter 337 (which has a phase opposite to that of inverter 330) provides a low logic signal to clamp the line 328 to logic zero to prevent the input of signals to integrator filter 62″. During the second half cycle of the foregoing example, inverter 337 provides a high logic level signal to line filter 62″, but since there is no signal output from amplifier 324 in such example, the envelope filter 62″ will not effect the operation of its associated Schmitt trigger 342.

In the example of a 1625 Hz. beat frequency and 60 Hz power frequency, the capacitor, such as capacitor 339 in line filter 62', integrates approximately 12 cycles of the beat frequency in the time between high logic level pulses from inverter 330, which extends over one-half of each of the 60 Hz. phases of the power on the conductor, to trigger one signal from Schmitt trigger 340 to digital filter 68. Of course, if the transmitter signals were encoded on the other half cycle of the power on the conductors by the opposite position of the encoder switch in the transmitter, the Schmitt trigger 342 would provide the sequence of driving pulses to the connected digital filter 69 while Schmitt trigger 340 is quiescent.

Digital filter 68 comprises a first stage counter 348 which divides the received sequence of pulse signals into units of sixteen pulses per unit, and a second stage counter 350 which counts three of the units to provide a signal at each of two ports to an inverting AND gate 352. The gate 352 is satisfied during the three count of the second stage which occurs from the 48th to the 63rd pulse output by Schmitt trigger 340. Since, as described, each channel interval extends over 64 cycles of the power, this interval for receiving a transmitter signal is within the time assigned to the transmitter channel, but requires detection of at least 48 of the transmitter channel signals before receipt of the transmitter signal is marked. Devices suitable for the filter counters 348–350 are designated SN7493N and commercially available from Texas Instruments Corporation.

Gate 352 as satisfied provides a signal through an inverter 354 to an input port of AND gate 70. Before inversion by the inverter 354, the signal from AND gate 352 is cross-coupled to AND gate 72. Thus, a signal from the AND gate 352 disables AND gate 72 and, after inversion, simultaneously enables the other AND gate 70. Each of the AND gates 70 and 72 also has a third input port, later described, which must be enabled to satisfy the gate.

With reference once more to signal phase detector 62''(FIG. 5B) a like path is provided for the output of the second Schmitt trigger 342 over path 342' to digital filter 69 which includes first and second stage counters 348', 350', and which are operative in the manner of counters 348', 350' to trigger an inverting AND gate 353 to enable gate 72 and, after inversion, disable AND gate 70 whenever the Schmitt trigger 342 provides pulses in response to an oppositely phase-encoded transmitter signal.

When enabled at each input port, the gate 70 provides an output signal to an enable port of a demultiplexermemory driver 74, which may be of the type commercially available from Texas Instruments Corporation as an SN74154N. The device performs as a demultiplexer in response to a logic signal from the gate 70 to enable a single ouput of the plurality output ports $O_1$–$O_{15}$ as determined by the channel selecting signals ABCD output by counter 40' in a manner to be described hereinafter.

In the generation of the channel selecting signals, phase detectors 30', 32' which are connected to conductors L1, L2 detect alternate half-cycles of the power phases on the two conductors which, as earlier described, are 180° out of phase with each other. Detectors 30' and 32' which are similar to the detectors 30, 32 identified in the transmitter description include Schmitt triggers 104', 104'' which provide alternately phased pulse output signals over OR gate 36'. The output signal from one trigger 104'' is also provided to the first two stages 106', 108' of a counter 40' which are connected as a timer portion 77 which divide the trigger signals which are output over conductor 37' at the 60 Hz. rate by 64 to provide channel identifying signals of approximately 1 second duration. A third stage 110' of the counter 40' provides a signal which identifies each of the channels to each of the input ports of gates 356 to successively enable the gates to provide signals which identify the successive channel sequence. For convenience, signals output from the gates 356 are separately identified ABCD; however, the four gates are used in a 16 binary signal combination, each combination identifying a different one of the channels of the transmitters in the associated group. The signals from the gates 356 are fed to the channel selector ports ABCD of each of the demultiplexers 74, 76, whereby each multiplexer as enabled selects the one of the discrete ports $S_0$–$S_{15}$ which corresponds to the channel identified by the 4 bit signal output from the gates 356.

Each of the discrete output ports of the demultiplexer 74 is connected to the set port of an indicated one of the flip-flops *22a–22p* which form part of the memory devices 22. Each output port of a similar demultiplexer 76 is controlled by the AND gate 72 associated with digital filter 69 and is connected to the reset port of an associated one of the flip-flops *22a–22p* in memory device 22. Thus as shown, the first output port $S_0$ of demultiplexer 74 is connected to the set port of the first memory flip-flop 22a, and the first output port $R_o$ of demultiplexer 76 is connected to the reset port of such flip-flop.

Signals from the demultiplexer output ports 74, 76 provide a signal which sets or resets its associated one of the flip-flops 22a-22p as determined by the set or reset port to which the signal is applied. For example, if gates 356 each provide a logic one signal, the signals (1111) which represent the sixteenth channel will control demultiplexers 74 and 76 to select the 16th output ports S15 and R15. However only the one of the demultiplexers 74, 76 which is enabled by the signal from its associated AND gate 70, 72 (i.e., which represents the phase of the transmitted signal at the time), will then send a signal to the flip-flop 22*p* which is connected to the selected port. In the present example, the phase of the signals transmitted were assumed to be such that the selected demultiplexer 74 is enabled to provide an output signal over output ports S15 to the set port of flip-flop 22*p*. If the flip-flop. 22*p* was set by reason of the signals received in the previous cycle, the flip-flop 22*p* changes to its set state.

A signal corresponding to the set or reset state of each flip-flop, such as 22*d*, is provided over conductor 23*a* to an associated one of the accumulator devices such as 77*a* for cumulative storage. The accumulators 77*a*–77*b* thus separately store a signal representing each change of state of the discrete one of the flip-flops 22*a*–22*p* which is connected thereto which in turn corresponds to each change of signal phase-encoding at the transmitter to represent a successive unit of meter measurement.

The receiver R additionally has devices for checking the synchronization of the receiver with the channels of the transmitter signals to assure the detection of transmitter signals only at appropriate channel intervals, and for performing other functions. These devices are collectively indicated at 79 (FIG. 3). For these devices, the first two stages 106', 108' (FIG. 5A) of the counter 40', form the timing circuit portion 78 of counter 40'. Each stage 106', 108' has a plurality of ports, which provide signals to several discretely corresponding ports of an inverting AND gate 370. A logic one signal output from each of these ports represent a count of 62, and therefore occurs once within each of the 64 cycles of the power which are counted to generate the 1 Hz. signals for the last stage of the counter, counter 110'. Since the 1 Hz. signals define the channels, the 62 pulse signal satisfying gate 370 indicates that a signal from a succeeding transmitter channel is about to be received. An output signal from the AND gate 370 is inverted by gate 372 to perform three functions.

For the first function, the trailing edge of the detected signal is inverted by gate 374 and integrated at 376 into a pulse which is inverted by gate 378 and provided over conductor 379 to a reset port of each of the digital filter devices 68 and 69. The signal resets each of the filter devices 68, 69 to its zero count in preparation for the count of the 48 to 63 pulses which are output by the signal phase detector 62 during the next signal channel.

Signals from AND gate 372 are also provided to the third, earlier mentioned enable port of the AND gates 70 and 72. Since, as described, this signal represents a last interval portion preceding each count of 64 power cycles which define the channel, it enables the gates 70 and 72 only during the last portion of the channel interval and disables the gates during the preceding portion. Transmitter signals detected at other intervals then will not trigger a signal from either of the gates 70 or 72 to enable the demultiplexers 74, 76.

For the third function of the signal from gate 370, the signal is provided over gate 372 and conductor 373 to an input port of a NAND gate 380. This gate will then be satisfied by a corresponding high logic level signal from an inverting exclusive OR gate 382 also connected to gate 380. The gate 382 receives a logic signal from a driver 384 which signal corresponds to channels identified by the binary coded inputs supplied to the driver 384 from the power gates 356, (again separately identified ABCD), and a preset table of discrete inputs to ports 385 corresponding to each channel. Switch device 387 includes switches 389 for independently grounding or opening a logic potential to each port 385 as schematically illustrated. These switches are independently preset according to the presence or absence of a transmitter for providing signals during the channel corresponding to the switch. If a channel identified by the channel signals ABCD as for example channel 0 is in use, i.e., a transmitter of the system is preset to provide an output signal during channel 0, the corresponding switch 389 is preset to provide a signal to the connected port 385 of driver 384 such that the driver provides a logic zero signal to gate 382. But if the channel is not in use, i.e. no transmitter of the system is preset to provide an output signal during channel 0, the switch 389 is preset to cause device 384 to provide a logic one to gate 382. Device 384 thus performs a table look-up function to determine which channels are in use. The driver 384 may be a device designated SN74150N commercially available from Texas Instruments Corporation while the switch device 387 may be of the type which is commercially available as a AMP7301.

In addition, the gate 382 receives a logic one signal over AND gate 386' from another inverting exclusive OR gate 386 only when the signal inputs to the gate do not correspond. One signal input to the gate 386 is derived from the signal from digital filter 68 to gate 70 while the other is derived from the signal from digital filter 69 to gate 72. It will be recalled that these signals are respectively responsive to the phase of the power on the conductor L2 during which a transmitter signal is detected. Thus simultaneously enabling the gates 352, 353 destroys the phase representation of the meter data and the ability to distinguish the transmitter encoded phase of the signal which represents the meter data, and is therefore an anomaly in the system. On the other hand, failure to detect any transmitter signal also provides similar signals to gates 70 and 72 since neither digital filter 68, 69 will reach the pulse count required to enable a signal from gates 352, 353. Inverting exclusive OR gate 386 detects these similar signals to provide a logic zero signal over conductor 386' to the inverting exclusive OR gate 382, but provides a logic one signal if but one digital filter 68 or 69 has enabled the connected one of gates 352, 353 to provide a signal through the inverter to the connected one of gates 70 or 72.

Then if a channel is in use and but one digital filter is satisfied by a detected transmitter signal, gate 382 receives a logic zero from device 384 and a logic one from gate 386 to provide a logic one signal to gate 380. But NAND gate 380 also receives the logic one signal from gate 372 to then provide a logic zero to a bi-stable flip-flop 390. The flip-flop 390 then remains in a stable state. Similarly, if a channel is not in use and neither digital filter provides a signal to gates 70 and 72, gate 382 receives a logic one from device 384 and logic zero from gate 386 to again provide a logic one to gate 380 which, in turn, gives a logic zero to flip-flop 390, leaving the flip-flop in a stable state. But, if gate 386 should provide a logic one signal to gate 382 indicating a detected transmitter signal during a channel signalled with a logic one from device 384 as not in use, or if gate 386 should provide a logic zero signal indicating no signal satisfying digital filters 68,69 (or the anomaly of both filters satisfied) during a channel signalled with a logic zero from device 384 as in use, gate 382 responds to the similar input signals with a logic zero signal to gate 380. Gate 380, again receiving the logic one signal from gate 372, then provides a logic one to flip-flop 390 which changes to its reset condition to provide a signal which is counted in connected counter 392.

The gate 356 (FIG. 5A) provides channel signal D is connected to the highest level port of the counter 110' to provide a logic one during the entire second-half of the counter's channel count. This logic one signal is carried to an inverter 394 and integrator at 396 to provide a reset signal to the bistable flip-flop 390 at the end of each frame of channels demarked with the trailing edge of the D logic one signal. The reset signal changes the state of flip-flop 390 to its initial set state if its state has been previously reset by a signal from gate 380. Since the flip-flop 390 is then reset only once each frame or cycle of transmitter channels, an anomaly in the transmitter signal in any one of the channels in each frame of channels will provide only one counted pulse to the counter 392.

Each channel D logic one signal, one per frame of the channels as before described, is also counted in a counter 398. The counter 398 counts to 8 and sends a reset signal to the counter 392. The counter 392 counts 4 anomaly signals from the bistable flip-flop 390 before providing an output logic one signal. If the counter 392 is reset to zero by the counter 398 before reaching the count of 4 anomaly signals, it therefore provides no output signal. Accordingly, the counters 392 and 398 form an error-averaging system in which a selected number of 4 errors of anomalies in any one of the meter-transmitter channel signals in each cycle of the channels must occur within 8 successive channel frames to trigger an error indicating logic one signal from the counter 392.

The logic one error signal from counter 392 is inverted at 400, integrated at 402 and provided to a port of a flip-flop 404 to set the flip-flop to provide an error indicating signal to the output line 85 through another inverter at 408. This error signal may be detected by means ultimately reading the accumulated meter measurements to signal that correction of the system is necessary. A switch 410 is manually operated to provide a reset signal to the flip-flop 404, resetting the flip-flop to remove the error signal.

OPERATION OF RECEIVER DESCRIBED IN DETAIL

In the receiver, device 302 mixes frequency band-passed transmitter signals in put over conductors L1, L2, LN with those of an oscillator 304 to form a beat frequency signal. An envelope filter integrates the beat signal, and combines it with signals representing alternate phases of the power on the conductor for triggering signals onto one of two lines corresponding to the phase of the conductor power during which the signal was received. Similar devices are connected to each of these lines to maintain the phase indication of the received transmitter signal which, it will be recalled, was encoded by a switch in the transmitter to indicate one of successive increments of meter measurements. One of the digital filters 68, 69 connected to the signal carrying line then counts a preselected number of the signal pulses on the line to provide an enabling signal to a connected NAND gate 352 only during a selected number of the signal pulses. The digital filter then effectively integrates the signal to verify that the received signal is of at least the preselected pulse count known to be within the number of the transmitter signals in one channel.

Since the signals to one or the other of the digital filters 68, 69 also represent the half-cycle phase of the power on the conductors during which the transmitter signal was received, only one of the gates 70 and 72, each connected to one of the filters, should be enabled at any one time. The signals to these gates 70, 72 are therefore cross-coupled with an inversion of the signal provided directly to one of the gates also supplied to the other. The gates 70 and 72 thus provide one check to assure that a transmitter signal was received only during the one appropriate phase of the power on the line.

As in the transmitter, the phases of the power on the conductors are divided into equal time intervals or channels, each of which was assigned to one of the transmitters. A signal indicating the channels is binary-encoded and provided to each of two demultiplexers 74 and 76 each of which is enabled to provide an output signal at a discrete port corresponding to the indicated channel by a signal from the connected one of the gates 70, 72 which represents the phase of the power on the conductor during which the signal was received, the phase of the signal representing one of successive increments of the meter measurement as encoded in the transmitter. The signal from the discrete, channel indicating port of the demultiplexers 74, 76 is provided to one of discrete memory device 22*a*–22*p* connected to the port to change the state of the memory device with a change in signal from one demultiplexer to the other. Each change in state of a memory device is signalled to a discretely connected accumulator 77 which then stores the accumulated increments of meter measurement for later reading by the transducer.

A further check of the appropriate synchronization of the received signals is also provided. For this check, a signal is derived in strobe and reset device 78 from a timer circuit portion of the channel counter. This signal from gate 370 resets with its leading edge the digital filter to assure that the digital filter appropriately integrates the next received signal. The same signal enables the gates 70 and 72 to provide the maximum time for integration of the signal just detected in the digital filters. The same signal is also provided to a coincidence detector, NAND gate 380, which detects the desired coincidence between the signal from gate 372 and that from inverting exclusive OR gate 382. Gate 382 receives a signal from gate 386 indicating by its logic value that a signal has or has not been properly received an integrated in only one of the digital filters 68, 69 during each channel and a signal from device 384 indicating by its logic value that a signal should or should not have been received from a transmitter during the channel as indicated in a preset table of channels used by transmitters then connected to the system. If the signals do not coincide, a flip-flop is signalled to change state to trigger a potential error signal. Total error signals over a selected number of successive frames of the channels are then averaged to ultimately trigger an error signal.

I claim:

1. In a remote meter system which uses alternating current power line conductors for data transmission purposes, a group of transmitter means coupled to said power line conductors, each of which transmitter means has a different meter associated therewith, each transmitter means comprising channel means including counter means for effecting a count of a predetermined plurality of cycles of the power on said line conductor to define a channel, each successive count of a predetermined series in a cycle defining a correspondingly different channel of a group of channels, encoding means for providing encoded signals which represent data provided by its associated meter, and enabling means in each transmitter means controlled by said counter means to enable its associated encoding means during a preselected one of said channels, the enabling means for different transmitter means being operative to enable its transmitter means in a different one of said channels, receiver means coupled to said power line conductors including means for detecting the encoded signals applied to said power line conductor in said different channels by each of said plurality of transmitter means, and means for effecting storage of the data represented by said encoded signals from each of said transmitter means in correspondingly different storage means.

2. A system as in claim 1 which includes a plurality of groups of said transmitter means coupled to said power line conductors and a plurality of receiver means coupled to said power line conductors, and in which each of said transmitter means in a group are operative to generate encoded signals at a frequency preassigned to its group for transmission over said power line conductors, the preassigned frequency for each of said transmitter groups being different, and in which each of said receiver means is tuned to detect signals of a different one of said preassigned frequencies.

3. In a meter system which uses alternating current power line conductors for data transmission purposes, a group of transmitter means coupled to said power line conductors, each of which transmitter means has a different meter associated therewith, channel means responsive to the power on said line conductors to cyclically define a plurality of channels for signal transmission purposes. encoding means for providing encoded signals which represent data provided by its associated meter, means for selectively coupling said encoded signals to said power line conductors during at least one of said channels which is preselected for use thereby, flicker means for detecting the interruption of power on said power line conductors, and reset means for said channel means enabled by said flicker means in response to a loss of power to control said channel means to initiate a new cycle, receiver means coupled to said power line conductors including means for detecting the encoded signals applied to said power line conductor in said different channels by each of said plurality of transmittermeans, and means for effecting storage of the data represented by said encoded signals from each of said transmitter means in correspondingly different storage means.

4. A remote meter system as set forth in claim 3 which includes power reset means which are operative to provide a reset signal to said channel means responsive to a power interruption of a length sufficient to disable said flicker means and the subsequent return of power to said line conductors.

5. In a remote meter system which uses alternating current power line conductors for data transmission purposes, a group of transmitter means coupled to said power line conductors, each of which transmitter means has a different meter associated therewith, channel means responsive to the power on said line conductors to cyclically define a plurality of channels for signal transmission purposes, encoding means for providing encoded signals which represent data provided by its associated meter, means for selectively coupling said encoded signals to said power line conductors during at least one of said channels which is preselected for use thereby, and receiver means coupled to said power line conductors including channel means for cyclically defining a plurality of channels in synchronism with said channels in said transmitter means, flicker means for detecting an interruption of power of a predetermined period on said power line conductors, and reset means for each channel means enabled by said flicker means in said receiver means in response to a loss of power for said predetermined period to thereby cause said channel means to initiate a new cycle.

6. A remote meter system as set forth in claim 5 in which each of said receiver means includes power reset means operative in response to loss of power on said power line conductors for a given period to provide a reset signal to said channel means in said receiver means which is delayed relative to the return of power to said power line conductors.

7. A system as set forth in claim 1 in which said enabling means comprise preselect means for providing a signal which represents the one of the channels which is assigned for use by said transmitter means, and comparator means connected to said counter means and said preselect means for enabling said encoding means to provide encoded signals to said power line conductors in the preselected channel.

8. A system as set forth in claim 7 which includes a plurality of memory means, and in which said means in said receiver means for detecting the encoded signals on said power line conductors includes data means for providing data representative signals for the detected signals, and said means for effecting storage of the data includes further channel means for providing signals which represent the different channels in each cycle, and means enabled by said further channel means and said data means to store said data representative signals received in each of the different channels of a cycle in a correspondingly different one of said memory means.

9. In a remote meter reading system which uses alternating current power line conductors for data transmission purposes, transmitter means including channel means for cyclically defining a plurality of channels for use in transmitting encoded signals over said power line conductors, encoder means for providing encoded signals which represent data provided by an associated meter, enabling means connected to said channel means for selectively enabling said encoder means to couple said encoded signals to said power line conductors during at least one of said channels which is preassigned thereto for signal transmission purposes, and flicker means for providing a reset signal to said channel means to initiate a new cycle in response to the interruption of power on said power line conductors.

10. A remote meter system as set forth in claim 9 which includes power reset means for providing a delayed reset signal to said channel means after a power interruption which is of a length sufficient to render said flicker means inoperative and the subsequent return of power to said power line conductors.

11. A remote meter system as set forth in claim 9 in which said channel means includes channel identification means for providing signals which identify each of said channels, and said enabling means includes preselect means for preselecting one of said channels for use by said transmitter means in the transmission of said encoded signals over said power line conductors, and comparator means connected to said preselect means and said channel identification means for enabling said encoder means to couple said encoded signals to said power line conductors during the channel which is preselected for use by said transmitter means.

12. A remote meter system as set forth in claim 11 in which said channel identification means comprise phase detector means connected to said power line conductors for detecting each half cycle of power on said power line conductors, counter means connected to said phase detector means for providing a different $n$-bit word for channel identification in response to each count of a predetermined number of cycles, and output means for providing said channel identification words to said comparator.

13. A remote meter system as set forth in claim 12 in which said preselection means comprises a plurality of switches, each of which is adjustable to provide one logic bit of an $n$-bit word which identifies the channel selected for the transmitter means, and means for connecting such word to said comparator means.

14. A remote meter system as set forth in claim 9 in which said channel means cyclically defines 16 channels for said transmitter means, each of which channels has a duration of approximately 64 cycles of the alternating current power on said power line conductors.

15. In a remote meter reading system which uses alternating current power line conductors for the transmission of encoded data representing signals, receiver means comprising channel means responsive to the power cycle on said power line conductors for cyclically providing signals which define a plurality of channels, detector means for detecting encoded data signals on said line during each channel which represent data output from a correspondingly different transmitter, memory means, and switching means enabled by said channel means for transmitting the data signals detected by said detecting means during each channel to said memory means, and flicker means for resetting said channel means to initiate a new cycle in response to the loss of power on said power line conductors.

16. A remote meter system as set forth in claim 15 which includes power reset means for providing a reset signal to said channel means to initiate a new cycle a predetermined period after a power interruption which is of a length sufficient to render said flicker means inoperative and the subsequent return of power to said power line conductors.

17. A remote meter system as set forth in claim 15 in which said channel means includes counter means responsive to the cycles of said power on said power line conductors to generate said signals which define said channels in each cycle, and in which said switch means comprise selection means having a plurality of outputs connected to said memory means, and a plurality of enabling inputs connected to said counter means to selectively connect the encoded data signals detected by said detecting means in different channels in each cycle to said different outputs.

18. A remote meter system as set forth in claim 17 in which encoded signals are at times transmitted over said power line conductors during one half cycle of said power and at other times during the other half cycle of said power, and in which said detector means include first means for providing an output signal when said encoded signal is detected during one of the half cycles, and second means for providing an output signal when said encoded signal is detected during the other one of the half cycles, and in which said selection means includes a first multiplex circuit having one input connected to said first means and its output connected to a first set of data storage circuits in said memory circuit, and a second multiplex circuit having one input connected to said second means and its outputs connected to a second set of data storage circuits in said memory means, the enabling inputs for each of said multiplexers being connected to said counter means.

19. A remote meter system as set forth in claim 17 in which encoded signals are at times transmitted during one half cycle of said power and at other times during the other half cycle of said power, and in which said detector means include first and second means for indicating the half cycle in which the incoming signals are received, and means for providing an error signal in response to simultaneous energization of said first and second means.

20. A remote meter reading system as set forth in claim 15 which includes marking means for identifying the channels assigned for use in each cycle, and means connected to said channel means and said marking means for providing an error signal in response to the occurrence of a signal on said power line conductor during a channel which is not identified by said marking means as an assigned channel.

21. A remote meter reading system as set forth in claim 20 in which said means for providing an error signal is also operative in response to absence of a signal on said power line conductor during a channel which is identified by said marking means on a channel assigned for use.

22. A remote meter reading system as set forth in claim 21 which includes means for averaging said error signals over a successive number of frames of said channels, and reset means operative in response to the occurrence of a predetermined number of error signals in a predetermined period.

* * * * *